United States Patent [19]

Sedlmair

[11] E Patent Number: Re. 33,540

[45] Reissued Date of Patent: Feb. 19, 1991

[54] SKI BRAKE

[75] Inventor: Gerhard J. Sedlmair, Farchant, Fed. Rep. of Germany

[73] Assignee: Marker Patentverwertungsgegesellschaft mbH, Barr, Switzerland

[21] Appl. No.: 489,344

[22] Filed: Mar. 5, 1990

Related U.S. Patent Documents

Reissue of:

[64] Patent No.: 4,470,614
Issued: Sep. 11, 1984
Appl. No.: 368,276
Filed: Apr. 14, 1982

[30] Foreign Application Priority Data

Apr. 22, 1981 [DE] Fed. Rep. of Germany ..... 3116039

[51] Int. Cl.[5] ..... A63C 7/10
[52] U.S. Cl. ..... 280/605
[58] Field of Search ..... 280/604, 605; 188/5

[56] References Cited

U.S. PATENT DOCUMENTS 3,964,760 6/1976 Riedel ..... 280/605

FOREIGN PATENT DOCUMENTS 45698 2/1982 European Pat. Off. ..... 280/605
2757723 11/1978 Fed. Rep. of Germany ..... 280/605

*Primary Examiner*—Charles A. Marmor
*Assistant Examiner*—Michael Mar
*Attorney, Agent, or Firm*—D. Peter Hochberg; Mark Kusner; Louis J. Weisz

[57] ABSTRACT

This invention provides an improved ski braking mechanism wherein the braking unit comprises a pair of Z-shaped, independently movable rods each having an outer leg attached to a braking spur, an inner leg attached to a brake pedal, and a central cross-bar forming a pivot axis. A stop is provided to inhibit the movement of the braking spurs towards the longitudinal middle section of the ski when the spurs are in the lowered braking position. Each braking spur is retractable towards the longitudinal middle section of the ski when the spurs are in the raised skiing position.

9 Claims, 1 Drawing Sheet

SKI BRAKE

Matter enclosed in heavy brackets [ ] appears in the original patent but forms no part of this reissue specification; matter printed in italics indicates the additions made by reissue.

FIELD OF THE INVENTION

This invention relates to an improved braking mechanism for a ski, comprising braking spurs movable from a raised skiing position to a lowered braking position. Such ski brakes are designed to inhibit the movement of the ski down a slope when the ski is detached from a skier's boot. The improvement comprises utilizing independent braking spurs having a stop means for inhibiting the movement of the braking spurs towards the longitudinal middle section of the ski when the braking spurs are in the lowered braking position. Additionally, the construction of the braking mechanism and independent nature of the braking spurs allows for retraction of each braking spur towards the longitudinal middle section of the ski when the braking spurs are in the raised skiing position.

BACKGROUND OF THE INVENTION

Ski braking mechanisms generally include braking spurs attached to a common braking unit. The braking unit is often a U-shaped rod having braking spurs at each end with the middle portion of the U-shaped rod attached to a brake pedal. Pivot axes for the arms extend along the middle portion of the U-shaped rod, between each braking spur and the brake pedal, allowing for pivotal movement of the braking unit. The brake pedal is urged in an upwards direction by a spring mechanism when the ski is detached from the skier's boot. This upwards movement of the brake pedal results in pivotal movement of the braking spurs from the raised skiing position to the lowered braking position. In the lowered braking position, the braking spurs inhibit the movement of the ski down the slope, thus avoiding the necessity of utilizing an ankle safety strap. The dangers of such safety straps are well known.

Braking mechanisms as described above have disadvantages. When in the raised skiing position, the braking spurs extend laterally from the ski and are essentially parallel to the edge of the ski. This lateral extension, although generally only slight, results in some contact between the braking spurs and the snow even when the spurs are in the raised skiing position. Obviously, skiing performance is somewhat impaired by the additional resistance created by the braking spurs, particularly when skiing in deep snow or when the ski is not flat against the snow, as in turns. Additionally, the contact results in unnecessary wear on the braking spurs.

Independently operating braking spurs are known and these also present some disadvantages. The braking spurs have a tendency to move towards the longitudinal middle section of the ski while in the lowered braking position. This results in decreased effectiveness of the braking spur. The braking spur generally comprises a metal rod, at the end of which is often positioned a spur cap, preferably of injection-molded plastic. The lower portion of the end of the spur cap is often substantially hook-shaped. The inwards motion of the braking spur can result in the hook-shaped spur cap either hooking the lower longitudinal edge of the ski during braking, or angling out of its position of maximum effectiveness for braking the ski.

SUMMARY OF THE INVENTION

The present invention overcomes shortcomings of the foregoing other bindings. The invention in its preferred form comprises a pair of Z-shaped, independently movable rods, each having an outer leg forming a braking spur and an inner leg attached to a brake pedal, and a central cross-bar forming a pivot axis. The independent movement of the braking units allows each braking spur to be retracted towards the longitudinal middle section of the ski when the braking spur is in the raised skiing position. In this manner, the braking spurs will not inhibit the motion of the ski and wear on the braking spurs is minimized.

The preferred embodiment of the invention further includes a stop for inhibiting the inwards motion of the braking spurs while in the lowered braking position. The stop does not inhibit the inwards motion when the braking spurs are in the raised skiing position. The stop may be formed on the cover plate of a bearing housing and may comprise flanges designed to inhibit sideways movement of the Z-shaped braking rods when the braking spurs are in the lowered braking position.

The construction of this braking mechanism is simple and it can be produced inexpensively.

BRIEF DESCRIPTION OF THE DRAWING

The drawing is a top view of a ski brake according to this invention with the top half illustrating a ski brake in the raised skiing position and the bottom half illustrating a ski brake in the lowered braking position.

DESCRIPTION OF THE PREFERRED EMBODIMENT

Figure 1:
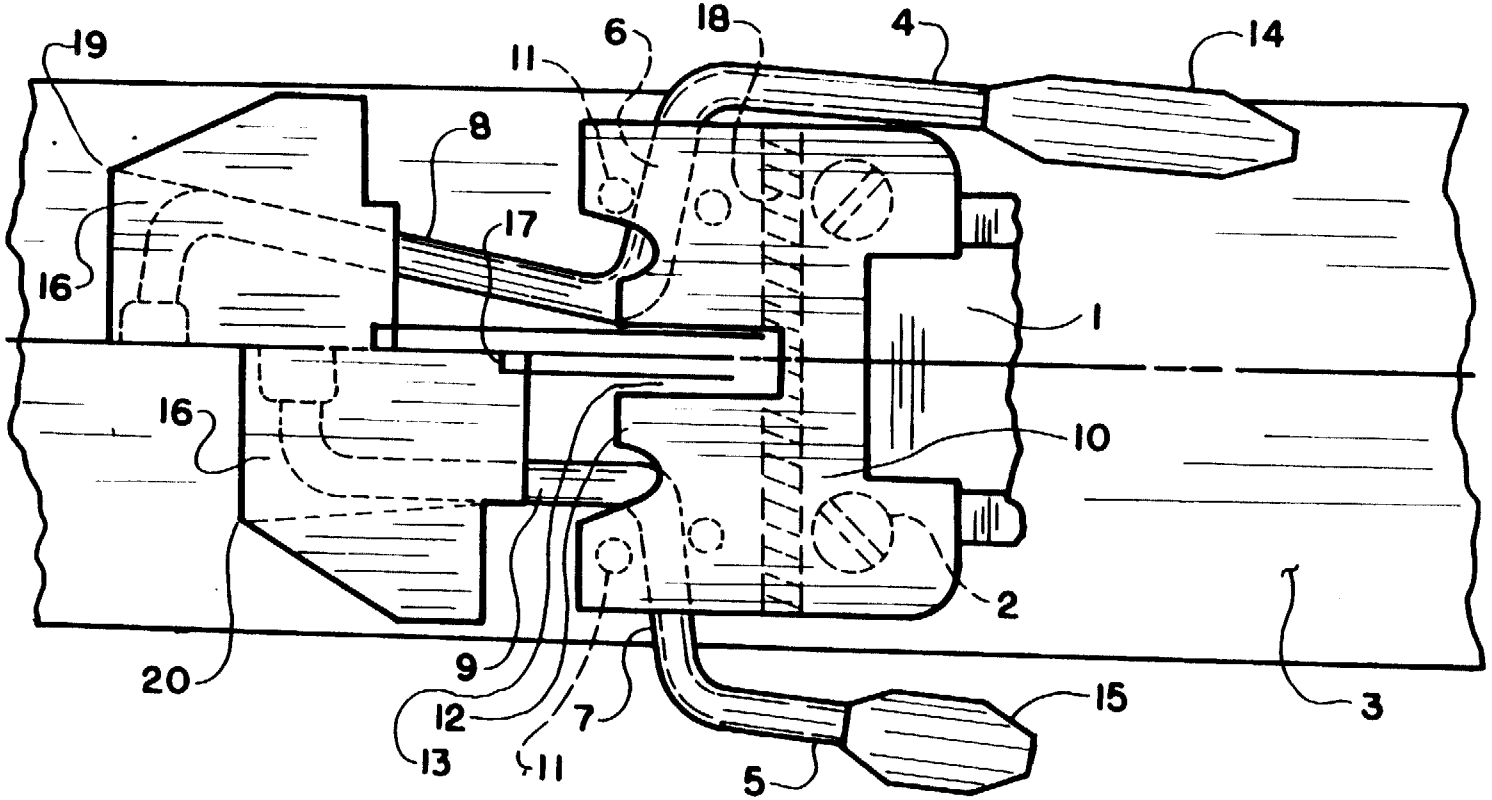

The drawing shows the top view of a braking mechanism according to this invention. The top half of the drawing shows the braking mechanism in its raised skiing position, while the bottom half illustrates the lowered braking position. Although the description below refers to a braking mechanism utilizing two Z-shaped rods and two braking spurs, one on each side of the ski, a braking mechanism utilizing one braking spur is also within the scope of the invention.

The braking mechanism has a base plate 1, which is fastened to a ski 3 by means of screws 2. The entire base plate is not shown in the drawing, rather it illustrates only the left half of the base plate. The right half of the base plate contains holding bars, guide bars, and the sole-holder, which are not aspects of this invention. The mechanism has two braking spurs 4, 5, each the outer legs of two Z-shaped rods. The rods further include a pair of inner legs 8, 9 which may be angled towards each other at the ends and attached to a brake pedal 16 in a manner allowing for pivotal movement of the angled ends. The ends of the inner legs 8, 9, if angled towards each other, may be flexibly joined.

The base plate 1 and a cover plate 10 from a bearing housing. In this bearing housing, the cross-pieces of the Z-shaped rods form pivot axes 6, 7. These pivot axes 6, 7 are held between pairs of rivets 11 which inhibit the movement of the pivot axes 6, 7 in the lengthwise direction of the ski 3. The rivets 11 stand perpendicular to the surface of the ski. Each rivet 11 is attached to its upper end to the cover plate 10 and at its lower end to the base plate 1. Into the cover plate 10 is molded a flange 12 which forms the stop according to this invention. When the braking spurs 4, 5 are in the raised skiing position, the flange 12 does not inhibit movement of the spurs 4, 5 toward the longitudinal middle section of the ski, as illustrated in the top half of the drawing. However, when the braking spurs 4, 5 are in the lowered braking position, as illustrated in the bottom half of the drawing, the flange 12 inhibits inward movement of the pivot axes 6, 7, thus inhibiting inward movement of the braking spurs 4, 5.

The cover plate 10 has a slot 13, dividing the flanges 12. The slot 13 allows for the passage of a coupling member 17 which is pivotally attached at one end to the base plate 1 and at the other end to the brake pedal 16. When the braking spurs 4, 5 are in the raised skiing position, the coupling member is substantially parallel to the surface of the ski 3. A spring 18 is attached to the base plate 1 and is positioned perpendicular to the lengthwise direction of the ski 3 and parallel to the surface of the ski 3. The spring 18 urges the coupling member 17 and, thus, the brake pedal 16 in an upwards direction when the ski 3 is detached from the skier's boot. The inner legs 6, 7, attached to the brake pedal 16, are also urged in an upwards direction, resulting in pivotal movement of the braking spurs 4, 5 to the lowered braking position.

A means is provided for urging the inner legs 8, 9 in a manner that causes the braking spurs 4, 5 to move towards the longitudinal middle section of the ski when the braking spurs 4, 5 are in the raised skiing position. This urging means may be guide bars 19, 20 attached to the bottom of the brake pedal 16. The guide bars 19, 20 only engage the inner legs 8, 9 when the braking mechanism is in the skiing position.

Spur caps 14, 15 are attached at the free ends of the braking spurs 4, 5 and increase the braking surface of the braking spurs 4, 5. These spur caps 14, 15 are preferably of injection-molded plastic, although other materials are appropriate. The lower portion of the ends of the spur caps 14, 15 may be substantially hook-shaped to provide additional braking efficiency when the braking spurs 4, 5 are in the lowered braking position.

It is also possible for the stop to merge into a guide track, which runs toward the longitudinal middle section of the ski. The guide track allows for a smooth transition of the braking spurs 4, 5 from the raised skiing position to the lowered braking position when the ski is detached from the skier's boot.

The invention has been described in detail with particular emphasis on the preferred embodiment, but it should be understood that there are variations and modifications within the scope and spirit of the invention.

I claim:

1. A ski brake mountable on a ski for impeding movement of the skier down a slope when the ski is detached from a skier's boot, the ski having a top surface, a bottom skiing surface, longitudinal side edges and a longitudinal middle section intermediate the longitudinal side edges, said ski brake comprising:

at least one braking spur rotatable about an axis transverse to the longitudinal side edges of the ski between a raised skiing position and a lowered braking position, said braking spur having an end disposed below the bottom skiing surface of the ski for engaging the snow when said braking spur is in the braking position:

an inner portion connected to said braking spur for controlling the movement of said braking spur;

pedal means movable between a lowered skiing position and a raised non-skiing position, said pedal means moving said inner portion to rotate said braking spur to the raised skiing position when said pedal means is in the lowered skiing position, and to the lowered braking position when said pedal means is in the raised non-skiing position;

biasing means for biasing said pedal means to the raised non-skiing position and said braking spur to the lowered braking position;

housing means for housing at least part of said inner portion of said ski brake, said housing means including top means for limiting the rotation of said braking spur in said lowered braking position and for engaging said inner portion to prevent lateral movement of said braking spur while in said braking position, said inner portion being disengaged from said stop means when said braking spur is in said raised skiing position to enable lateral movement of said braking spur with respect to said housing means.

2. The invention of claim 1, wherein said inner portion of the ski brake comprises an inner leg and a generally Z-shaped round wire part having a cross piece interconnecting said spur and said inner leg; each cross piece comprising a pivot axis for lowering said spur from said skiing position to said braking position; and, wherein said stop means is positioned between said inner portion and said longitudinal middle section.

3. The invention according to claim 2 wherein said inner leg and said Z-shaped part is generally coplanar.

4. The invention according to claim 2 wherein said braking spur and said cross piece is generally coplanar.

5. The invention according to claim 2 wherein said inner leg is generally perpendicular to the longitudinal edges of the ski when the ski brake is mounted on the ski.

6. The invention according to claim 2 and further including means for restraining said pivot axis against longitudinal movement during movement of said end between the skiing and braking positions.

7. The invention of claim 1, wherein said stop means comprises a flange formed on said housing means.

8. The invention according to claim 1, and further including guide means for urging the braking spur toward the longitudinal middle section of the ski when said braking spur is in the raised position.

9. The invention according to claim 5 wherein said inner portion of the ski brake includes inner leg, and said guide means comprises means for urging said inner leg towards said middle section when said braking spur is in the raised position.

* * * * *